United States Patent
Coblenz et al.

(10) Patent No.: US 9,684,646 B2
(45) Date of Patent: Jun. 20, 2017

(54) REFERENCE REPRESENTATION AND TRANSFORMATION IN COLLABORATIVE DOCUMENTS

(71) Applicant: APPLE INC., Cupertino, CA (US)

(72) Inventors: Michael Jeremy Coblenz, Sunnyvale, CA (US); Shawn Patrick Flisakowski, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 380 days.

(21) Appl. No.: 14/452,415

(22) Filed: Aug. 5, 2014

(65) Prior Publication Data

US 2016/0041963 A1    Feb. 11, 2016

(51) Int. Cl.
*G06F 17/24* (2006.01)
*G06F 17/22* (2006.01)

(52) U.S. Cl.
CPC ........ *G06F 17/245* (2013.01); *G06F 17/2288* (2013.01); *G06F 17/246* (2013.01)

(58) Field of Classification Search
None
See application file for complete search history.

(56) References Cited

U.S. PATENT DOCUMENTS 6,006,239 A * 12/1999 Bhansali ............... G06F 17/246
7,953,696 B2   5/2011 David et al.
8,732,247 B2   5/2014 Dittmer-Roche
2014/0095436 A1   4/2014 Ryder
2015/0199270 A1* 7/2015 Day-Richter ....... G06F 12/0253
                                                                                                     707/816

OTHER PUBLICATIONS

Abdessamad Imine et al.; "Proving Correctness of Transformation Functions in Real-Time Groupware;" Proceedings of the 8th European Conference on Computer-Supported Cooperative Work, Sep. 14-18, 2003; pp. 277-293.
Stephane Weiss et al.; "An Undo Framework for P2P Collaborative Editing;" 4th International Conference on Collaborative Computing : Networking, Applications and Worksharing—CollaborateCom 2008, vol. 10, (2008); pp. 529-544.

* cited by examiner

*Primary Examiner* — Asher Kells
(74) *Attorney, Agent, or Firm* — Fletcher Yoder PC

(57) ABSTRACT

The present disclosure relates to implementing changes to a data structure, such as a formula, in a collaborative context. In certain embodiments, collaborative changes made to a formula containing references to other portions of a table are retained or account for when an undo operation is performed. In one aspect, unique identifiers are used to identify and track table features, such as columns, rows, or cells, which may be moved, deleted, or created during a collaborative session. In some instances, collaborative changes may be logged for later application or applied to commands in an undo stack to prevent loss of changes.

21 Claims, 19 Drawing Sheets

|         | A [ID2] | B [ID4] | C [ID6] | D [ID8] | E [ID10] | F [ID12]   |
|---------|---------|---------|---------|---------|----------|------------|
| 1 [ID1] |         |         |         |         |          | =SUM(B2:B3)|
| 2 [ID3] |         |         |         |         |          |            |
| 3 [ID5] |         |         |         |         |          |            |
| 4 [ID7] |         |         |         |         |          |            |
| 5 [ID9] |         |         |         |         |          |            |
| 6 [ID11]|         |         |         |         |          |            |

|   | A [ID2] | B [ID4] | C [ID6] | D [ID8] | E [ID10] | F [ID12] |
|---|---|---|---|---|---|---|
| 1 [ID1] |   |   |   |   | =A5 |   |
| 2 [ID3] |   |   |   |   |   |   |
| 3 [ID5] |   |   |   |   |   |   |
| 4 [ID7] |   |   |   |   |   |   |
| 5 [ID9] |   |   |   |   |   |   |
| 6 [ID11] |   |   |   |   |   |   |

FIG. 10A

|   | A [ID2] | B [ID4] | C [ID6] | D [ID8] | E [ID10] | F [ID12] |
|---|---|---|---|---|---|---|
| 1 [ID1] |   |   |   |   | =A5 |   |
| 2 [ID3] |   |   |   |   |   |   |
| 3 [ID5] |   |   |   |   |   |   |
| 4 [ID7] |   |   |   |   |   |   |
| 5 [ID9] |   |   |   |   |   |   |
| 6 [ID11] |   |   |   |   |   |   |

FIG. 10B

|   | A [ID2] | B [ID4] | C [ID6] | D [ID8] | E [ID12] |
|---|---|---|---|---|---|
| 1 [ID1] |   |   |   |   |   |
| 2 [ID3] |   |   |   |   |   |
| 3 [ID5] |   |   |   |   |   |
| 4 [ID7] |   |   |   |   |   |
| 5 [ID9] |   |   |   |   |   |
| 6 [ID11] |   |   |   |   |   |

FIG. 10C

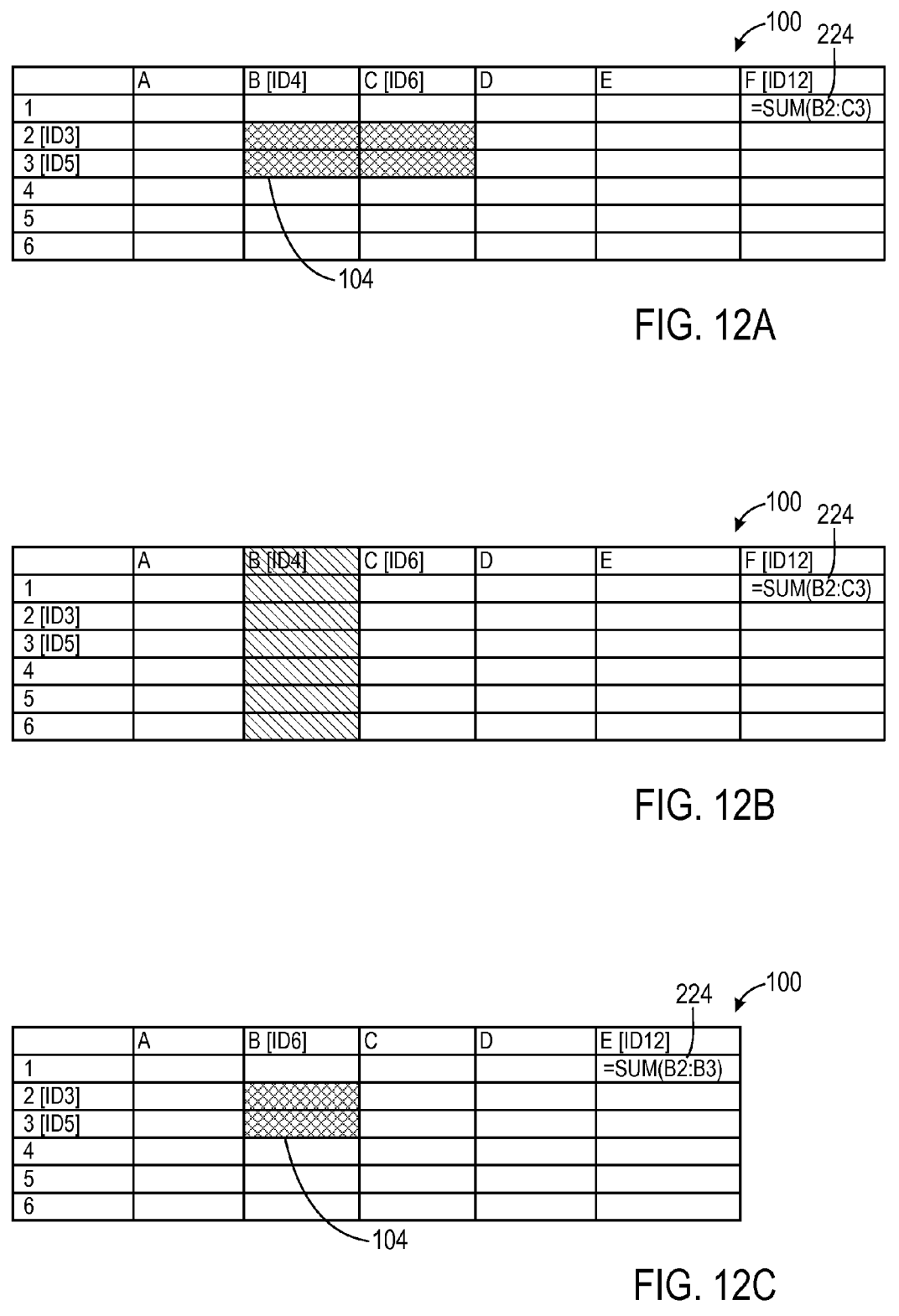

|   | A | B [ID4] | C [ID6] | D | E | F [ID12] |
|---|---|---------|---------|---|---|----------|
| 1 |   |         |         |   |   | =SUM(B2:C3) |
| 2 [ID3] |   | ▓▓▓ | ▓▓▓ |   |   |   |
| 3 [ID5] |   | ▓▓▓ | ▓▓▓ |   |   |   |
| 4 |   |   |   |   |   |   |
| 5 |   |   |   |   |   |   |
| 6 |   |   |   |   |   |   |

FIG. 12A

|   | A | B [ID4] | C [ID6] | D | E | F [ID12] |
|---|---|---------|---------|---|---|----------|
| 1 |   |         |         |   |   | =SUM(B2:C3) |
| 2 [ID3] |   |   |   |   |   |   |
| 3 [ID5] |   |   |   |   |   |   |
| 4 |   |   |   |   |   |   |
| 5 |   |   |   |   |   |   |
| 6 |   |   |   |   |   |   |

FIG. 12B

|   | A | B [ID6] | C | D | E [ID12] |
|---|---|---------|---|---|----------|
| 1 |   |         |   |   | =SUM(B2:B3) |
| 2 [ID3] |   | ▓▓▓ |   |   |   |
| 3 [ID5] |   | ▓▓▓ |   |   |   |
| 4 |   |   |   |   |   |
| 5 |   |   |   |   |   |
| 6 |   |   |   |   |   |

FIG. 12C

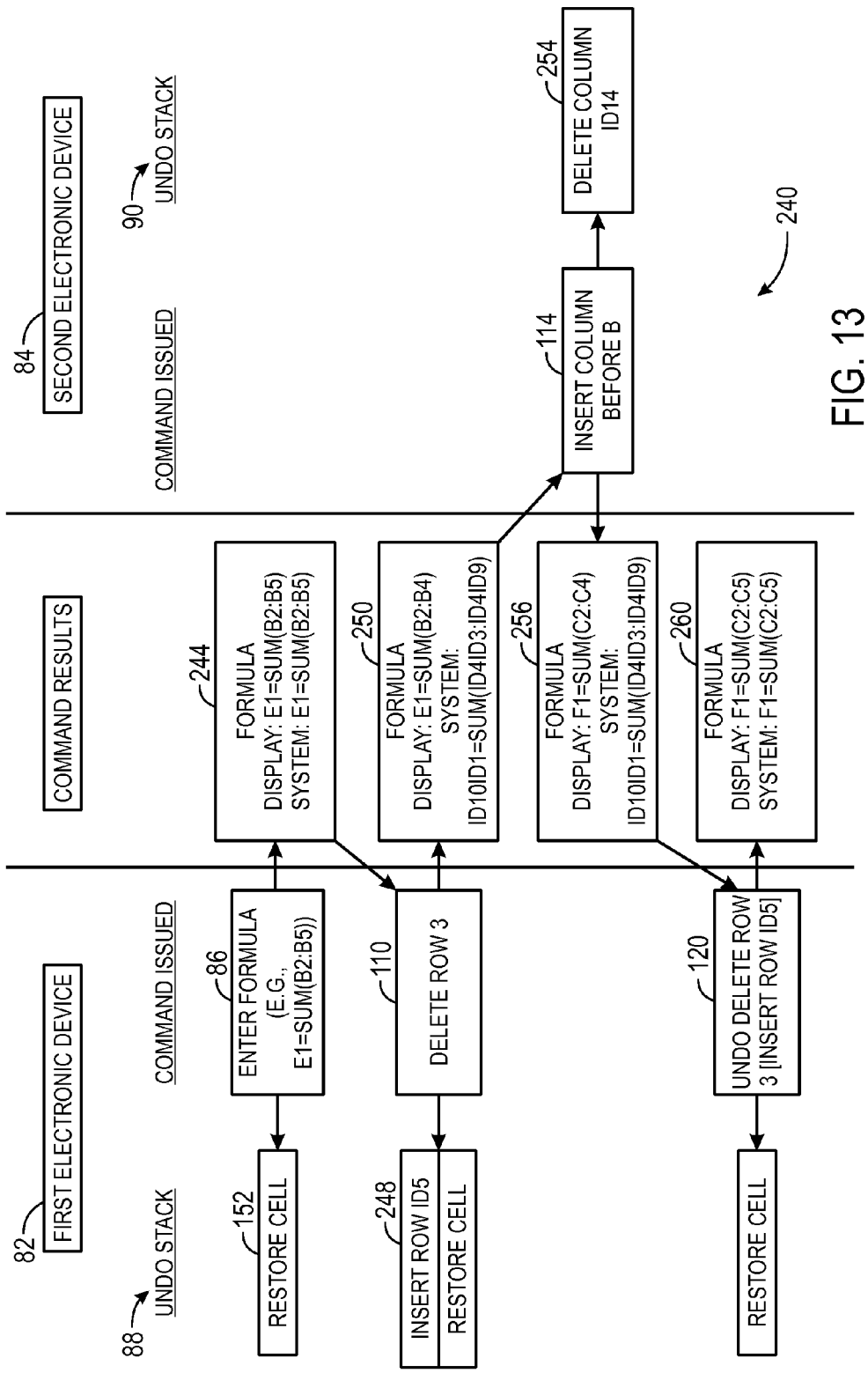

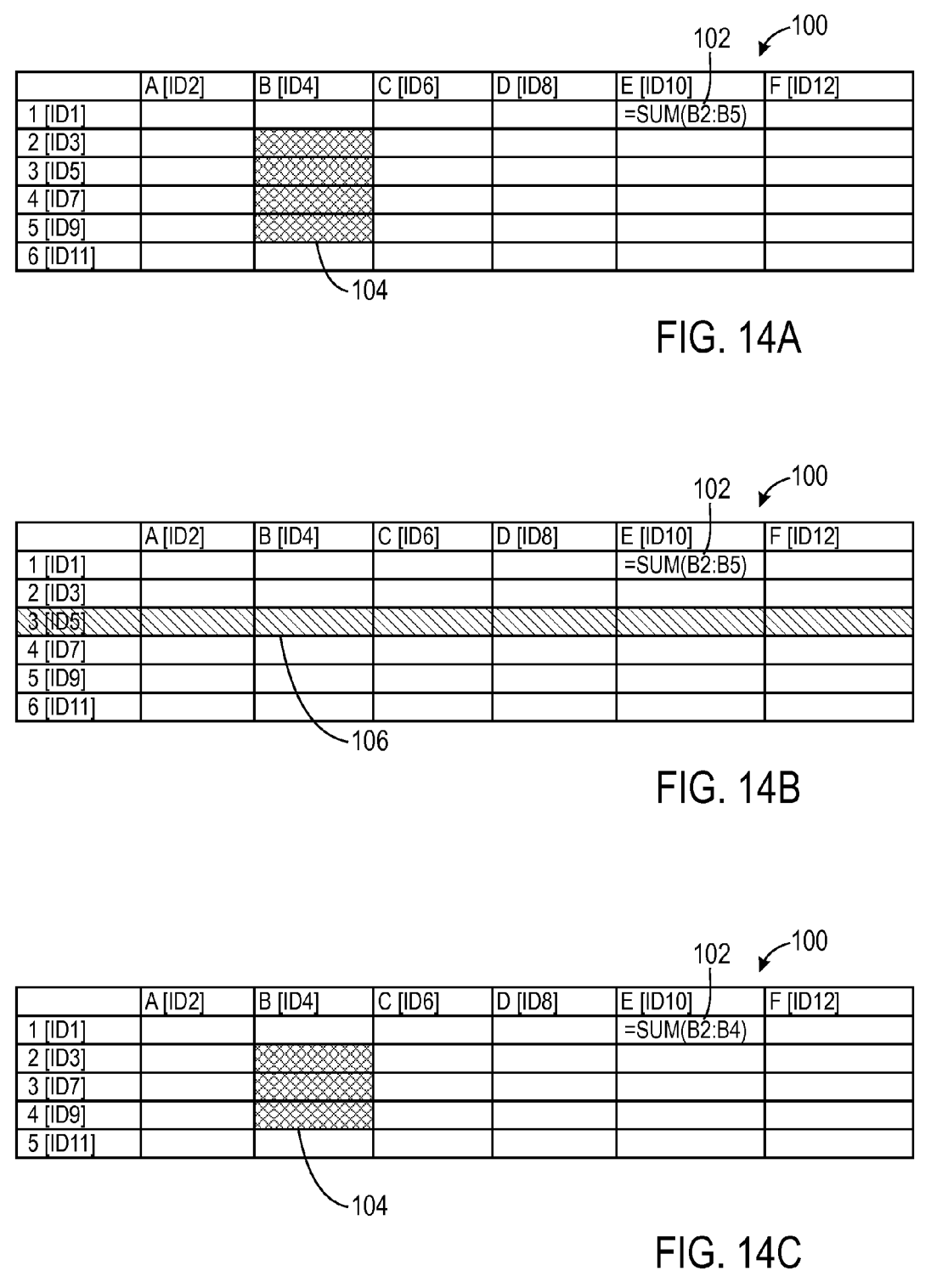

|   | A [ID2] | B [ID4] | C [ID6] | D [ID8] | E [ID10] | F [ID12] |
|---|---|---|---|---|---|---|
| 1 [ID1] |   |   |   |   | =SUM(B2:B5) |   |
| 2 [ID3] |   |   |   |   |   |   |
| 3 [ID5] |   |   |   |   |   |   |
| 4 [ID7] |   |   |   |   |   |   |
| 5 [ID9] |   |   |   |   |   |   |
| 6 [ID11] |   |   |   |   |   |   |

FIG. 14A

|   | A [ID2] | B [ID4] | C [ID6] | D [ID8] | E [ID10] | F [ID12] |
|---|---|---|---|---|---|---|
| 1 [ID1] |   |   |   |   | =SUM(B2:B5) |   |
| 2 [ID3] |   |   |   |   |   |   |
| 3 [ID5] |   |   |   |   |   |   |
| 4 [ID7] |   |   |   |   |   |   |
| 5 [ID9] |   |   |   |   |   |   |
| 6 [ID11] |   |   |   |   |   |   |

FIG. 14B

|   | A [ID2] | B [ID4] | C [ID6] | D [ID8] | E [ID10] | F [ID12] |
|---|---|---|---|---|---|---|
| 1 [ID1] |   |   |   |   | =SUM(B2:B4) |   |
| 2 [ID3] |   |   |   |   |   |   |
| 3 [ID7] |   |   |   |   |   |   |
| 4 [ID9] |   |   |   |   |   |   |
| 5 [ID11] |   |   |   |   |   |   |

FIG. 14C

REFERENCE REPRESENTATION AND TRANSFORMATION IN COLLABORATIVE DOCUMENTS

BACKGROUND

The present disclosure relates generally to facilitating collaborative document development.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various types of documents (e.g., word processing documents, spreadsheets, slides for slideshows, and so forth, may be generated or edited on various types of processor-based systems, such as computers. In certain instances, there may be a single author or editor entering text or formatting changes in a sequential manner, which can be implemented in a straight forward manner. In practice the changes made by a single user may be implemented by applying a change (i.e., a forward action or a forward case change operation) specified by the user and by applying, as needed, any undo or redo operations specified by the user.

However, in collaborative contexts, where changes may be generated in parallel by two or more authors, coordination of the application of the changes made by the different parties may be problematic to implement in practice and may represent a potential for the loss of one party's changes. By way of example, to the extent that each party may be provided the ability to undo their prior change to the document, changes made by the other party may be at risk for loss if not somehow accounted for.

The risk of data or change loss may be even greater in certain contexts where data constructs or structures are employed, particularly to the extent such data constructs may be permitted to reference other portions of a collaborative document that may be changed without explicitly changing the data construct directly. For example, in a table (e.g., spreadsheet) context, a formula may be entered into a cell of the table which references or relies on other cells of the table. In such a context, one or both of the collaborating parties may make changes to the table (such as by inserting, deleting or moving one or more referenced rows, columns or individual cells of the table) that affect the formula even though the formula is not explicitly altered by either party. In such a context, certain of the changes made by one party that affect (e.g., move or delete) one or more of the referenced cells of a formula may be lost due to actions taken by the other party (such as due to an undo operation) that fail to account for the second party's changes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to implementing undo and redo operations in a collaborative context with respect to formulas provided in a document (e.g., a spreadsheet table). In particular, to the extent that such formulas may reference other cells within a table, an indexing scheme distinct from conventional geometric cell addressing schemes (e.g., cell A4, B5, or G32) may be selectively employed in circumstances where there is a risk of data or change loss. In one embodiment, the indexing scheme retains a persistent and unique address for columns, rows, and cells of a table, even when such columns, rows, or cells are moved or repositioned (such as due to drag-and-drop operations or sorting operations), merged and unmerged, deleted, inserted, or undeleted. Formulas, when tracked (such as when referenced in an undo operation stack (i.e., an undo stack)) may be written or rewritten to reference the columns, rows, or cells of interest using the unique identifiers, instead of or in addition to geometric coordinates, in circumstances where data or change loss may occur.

In addition, in certain embodiments changes made by a collaborator (or by a single user employing different machines or independent windows on the same machine to edit a single document) that would affect calls referenced by a formula may be tracked, such as in a log, or may be applied to operations stored in an undo stack to prevent loss of the collaborators' changes in the event of an undo operation. By way of example, a first collaborator performing an undo operation may have the effect of returning a formula to an earlier state, with the potential for loss of intervening changes made by the collaborator. In certain embodiments, such intervening changes may be selectively tracked or applied (as opposed to more generalized operational transform (OT) schemes) to formula-related operations in the first party's undo stack so as to prevent loss of these changes with respect to the tracked formulas.

BRIEF DESCRIPTION OF THE DRAWINGS

Various aspects of this disclosure may be better understood upon reading the following detailed description and upon reference to the drawings in which:

FIG. 6A-6F depict sample screen shots corresponding to the process flow of FIG. 5;

FIGS. 10A-10F depict sample screen shots corresponding to the process flow of FIG. 9;

FIGS. 12A-12F depict sample screen shots corresponding to the process flow of FIG. 11;

FIG. 13 depicts an additional example process flow of a collaborative operation involving a formula, in accordance with aspects of the present disclosure;

FIGS. 14A-14F depict sample screen shots corresponding to the process flow of FIG. 11.

DETAILED DESCRIPTION OF SPECIFIC EMBODIMENTS

Figure 1:
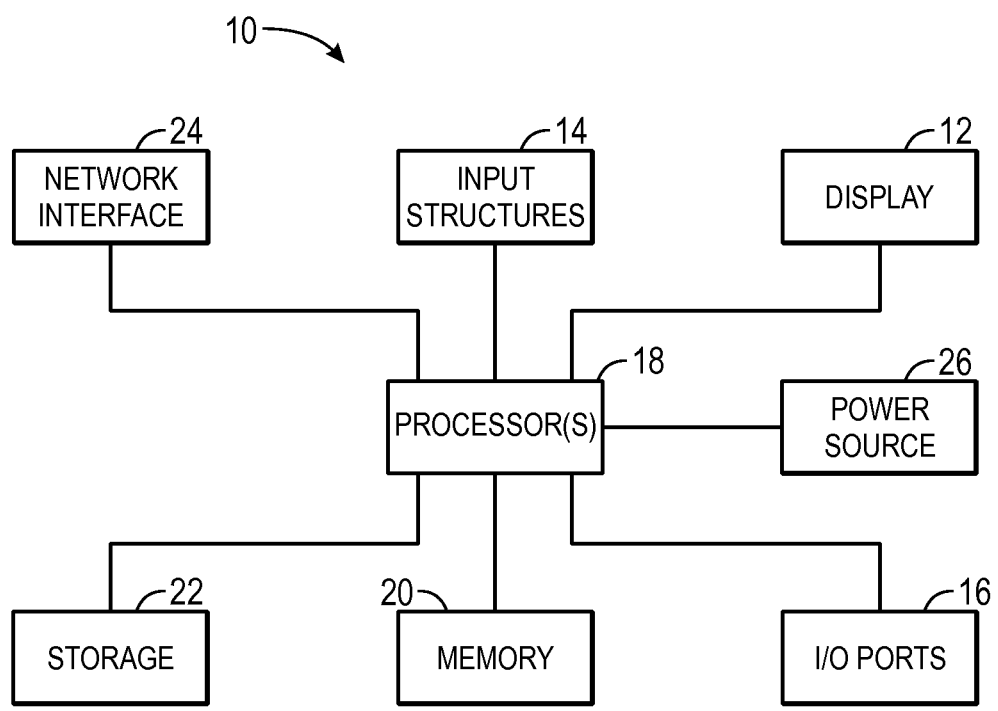
FIG. 1 is a block diagram of an electronic device that may use the techniques disclosed herein, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The disclosure is generally directed to facilitating collaborative document production and editing. In particular, aspects of the present disclosure are directed to the collaborative manipulation of tables (such as in a spreadsheet or other applications) that may include formulas referencing other cells within a given table. As used herein, it should be understood that collaboration (e.g., collaborative editing) may encompass more than one person who is editing or otherwise modifying a document (i.e., a collaborative document), such as using separate machines. It should also be understood though that collaboration may, in some instances also encompass the actions of a single user, such as a user who is accessing and modifying a document from two different electronic devices or even from a single device using independent windows. Thus, collaboration as used herein encompasses the actions of not only multiple individuals accessing and changing a document, but also the actions of a single individual who might be accessing and editing a document via different devices or via independent windows.

To reduce or prevent the loss of collaborative changes with respect to such formulas, an indexing scheme may be employed to identify and track cells, columns, or rows of the table, even when changes have been made by one or more of the collaborators that might remove or move a set of cells from the table, temporarily or permanently. In addition, collaborative changes may be selectively logged or applied to an undo stack of commands to prevent loss of collaborative changes in the event of an undo operation affecting a formula.

In practice, the code for implementing such a collaborative framework may be coded to operate on various types of devices or operating systems. Such implementations may be implemented using a suitable programming language, such as Objective-C®, available from Apple Inc. of Cupertino, Calif. Alternatively, a device agnostic approach may be employed by implementing the collaborative code framework in conjunction with one or more types of browser suitable for running on different devices or operating systems. Such implementations may be implemented using a suitable programming language, such as JavaScript®.

Figure 2:
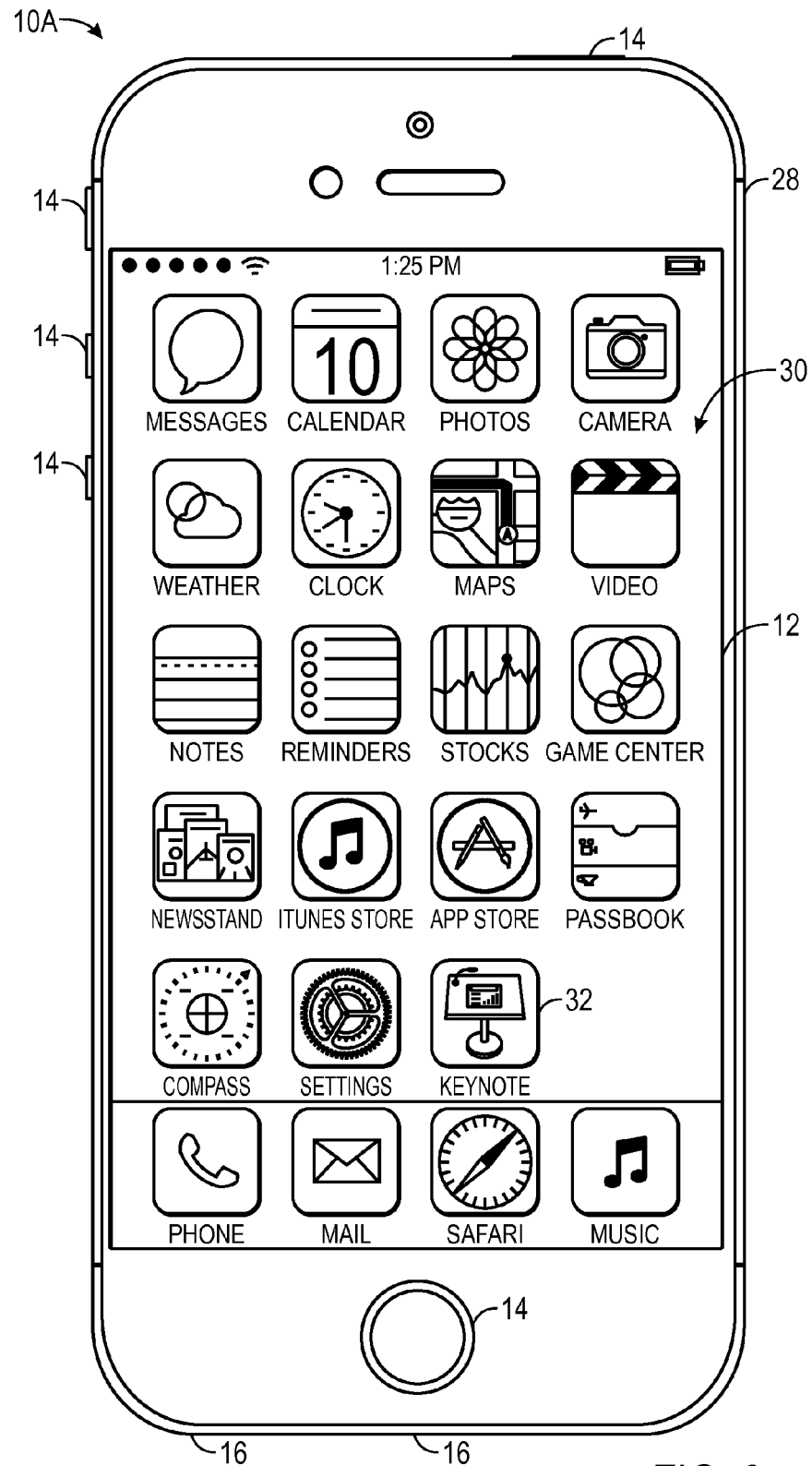
FIG. 2 is a front view of a handheld device, such as an iPhone® by Apple Inc., representing an example of the electronic device of FIG. 1.
Figure 3:
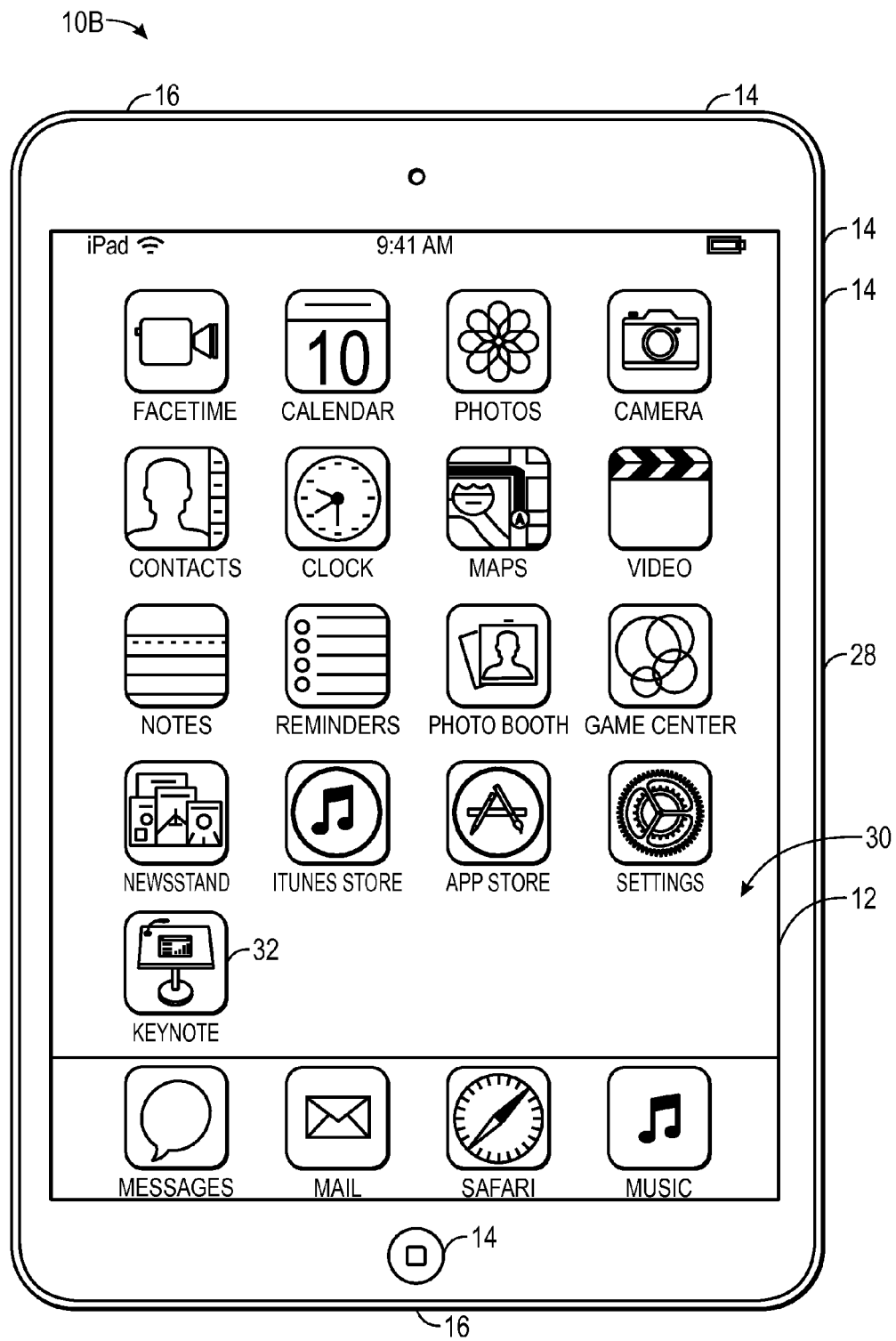
FIG. 3 is a front view of a tablet device, such as an iPad® by Apple Inc., representing an example of the electronic device of FIG. 1.
Figure 4:
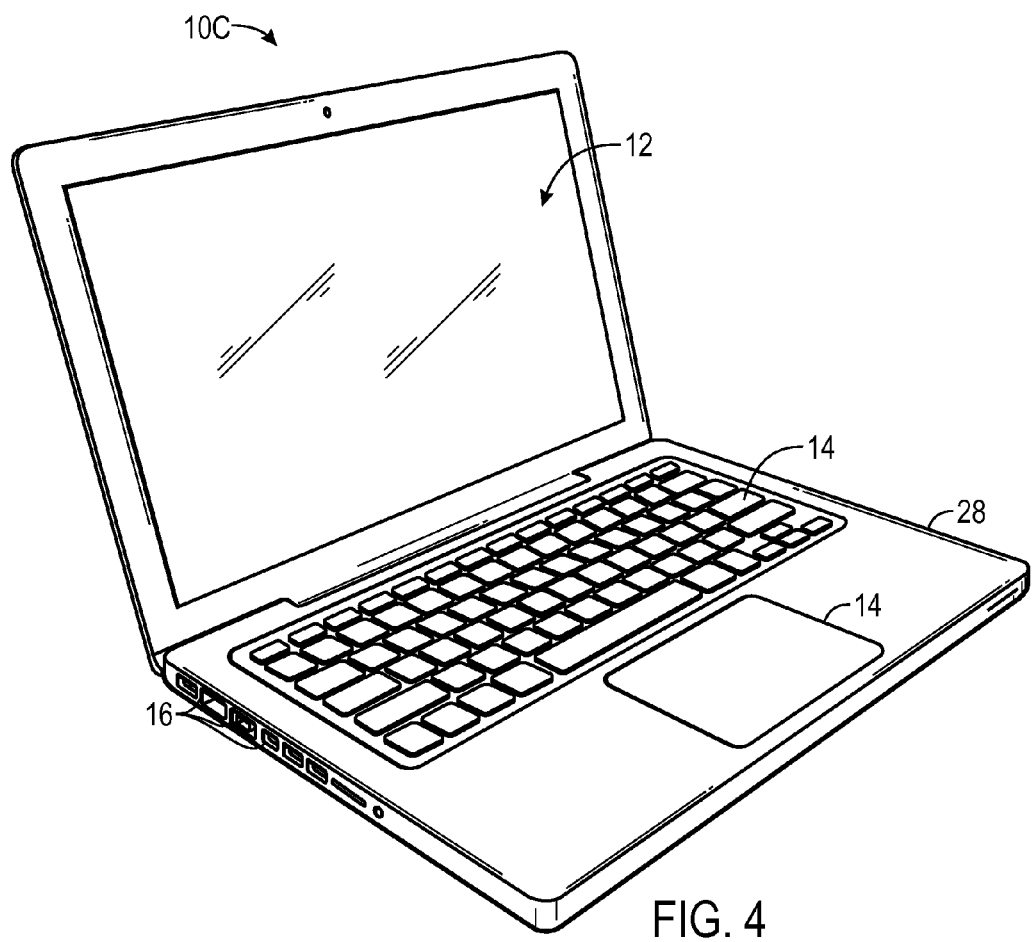
FIG. 4 is a perspective view of a notebook computer, such as a MacBook Pro® by Apple Inc., representing an example of the electronic device of FIG. 1.

A variety of suitable electronic devices, or browsers running on such devices, may employ the techniques described herein to support document generation or modification in a collaborative context. FIG. 1, for example, is a block diagram depicting various components that may be present in a suitable electronic device 10 that may be used in the implementation of the present approaches. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium, such as for implementing a productivity application or web browser) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.), web browser (e.g., Safari® by Apple Inc.), or an application program (e.g., Numbers®, Pages®, or Keynote® by Apple Inc.) or a suite of such application programs (e.g., iWork® by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a web browser (e.g., Safari® by Apple Inc.), spreadsheet application program (e.g., Numbers® by Apple Inc.), a presentation application program (e.g., Keynote® by Apple Inc.), or a word processing application program (e.g., Pages® by Apple Inc.). User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the spreadsheet or other application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Safari®, Numbers®, Pages®, or Keynote® by Apple Inc.) running on the computer 10C.

With the preceding in mind, a variety of computer program products, such as web browsers, applications or operating systems, may use or implement the techniques discussed below to enhance the user experience on the electronic device 10, such as when collaboratively working on a document (e.g., a spreadsheet table). Indeed, any suitable computer program product that provides for the creation or modification of a document (e.g., a word processing document, a spreadsheet, a slideshow presentation, a plain text document, and so forth) in a collaborative environment may employ some or all of the techniques discussed herein. Though reference to certain types of documents, such as spreadsheets, are described herein by way of example and to facilitate explanation, it should be appreciated that the present approaches are not limited to these types of documents but are instead more generally applicable to any collaborative context where a formula or other data construct is employed that references other portions of the document. Thus, while the following examples are provided in the context of a spreadsheet application, the present approaches are suitable for use in other applications (e.g., presentation applications, and so forth) where collaborative document generation and modification may be employed.

With the preceding in mind, an electronic device 10 may store and run a spreadsheet application (e.g., Numbers® from Apple Inc.) or other suitable application used to collaboratively generate or modify a document. The application may be stored as one or more executable routines (which may encode and implement the actions described below) in memory and/or storage (FIG. 1). Alternatively, such executable routines may be implemented as part of a web browser implementation which supports collaborative document development or applications running within the browser that support such collaborative document development. These routines, when executed, may cause control codes and logic as discussed herein to be implemented on the electronic device or on a separate electronic device (e.g., a server or other network-connected device) in communication with the electronic device 10. In certain embodiments discussed herein, different users, each using an electronic device 10 that executes routines as discussed herein, may collaboratively create or modify a single document.

For example, each user may make changes in a document on which they are collaborating that contains a formula referencing other portions (e.g., cells, rows, or columns of a table) of the document. In such a collaborative context, each device 10 is configured to implement operations such as: (1) a forward change operation (i.e., forward action) in which a change input by a user is applied; and (2) an undo operation (in which a previous forward action may be undone, such as by performing an inverse action or operation of the preceding forward action. In practice, as each forward action entered by a given user is entered and executed on their respective device, the forward action is also used to generate an inverse command that is stored in an "undo" stack of commands for that device, and the forward action is forwarded to the respective devices of collaborators for execution on the collaborator's devices. For example, user A generating a command on his device to insert Row 2 into a collaborative table would cause the following actions to be performed: (1) the forward action "insert Row 2" would be performed on the device of User A; (2) the forward action "insert Row 2" would be sent to the device of the collaborator (e.g., User B) for execution on that respective device; and (3) the inverse command, "delete Row 2," would be generated and added to the undo stack of user A on his device.

In this example, forward actions generated at a given device may store information from the document at the time of generation. Thus, only forward actions generated at a given device result in corresponding inverse actions being added to the respective device's undo stack. Thus the possibility exists that invoking an undo action may result in the loss of changes made by a collaborator in an intervening time period between when the undo stack command was added and when the undo command was invoked.

In order to better understand the following examples and discussion, it may be useful to initially provide some general context regarding current approaches for referencing cells, columns, or rows of tables. For example, what is referred to as geometric referencing herein refers to cell, column, or row references based on the address tabs or headers provided as part of the table for user reference. In particular, columns may be denoted sequentially by alphabetic headers (i.e., columns A, B, C, and so forth), while rows may be denoted sequentially by numeric addressing (i.e., rows 1, 2, 3, and so forth). In such a geometric referencing scheme, the sequence is maintained, even when changes are made to the table. That is, an instruction to delete column C does not result in the absence of a column C from the table, but instead results in the adjacent column (i.e., column D) taking the place of and being referenced as column C, with corresponding changes being made down the line of columns. Thus, a reference to a given column and row may, as changes are made to the table, reference different cells at different times unless the reference field is changes to account for these changes. While such reference tracking may be straightforward in the single-user case, it may prove imperfect in the collaborative context where multiple users are making changes to a table in parallel and where the undo functionality of each user fails to account for all actions applied to the table.

Proceeding to the examples, and turning to FIG. 5 and FIGS. 6A-6F, a process flow is depicted (FIG. 5) showing a conventional approach employing only geometric referencing in which collaborator changes may be lost. In these figures, FIGS. 6A-6F depict representative screenshots of a sample table to better illustrate the example.

Figure 5:
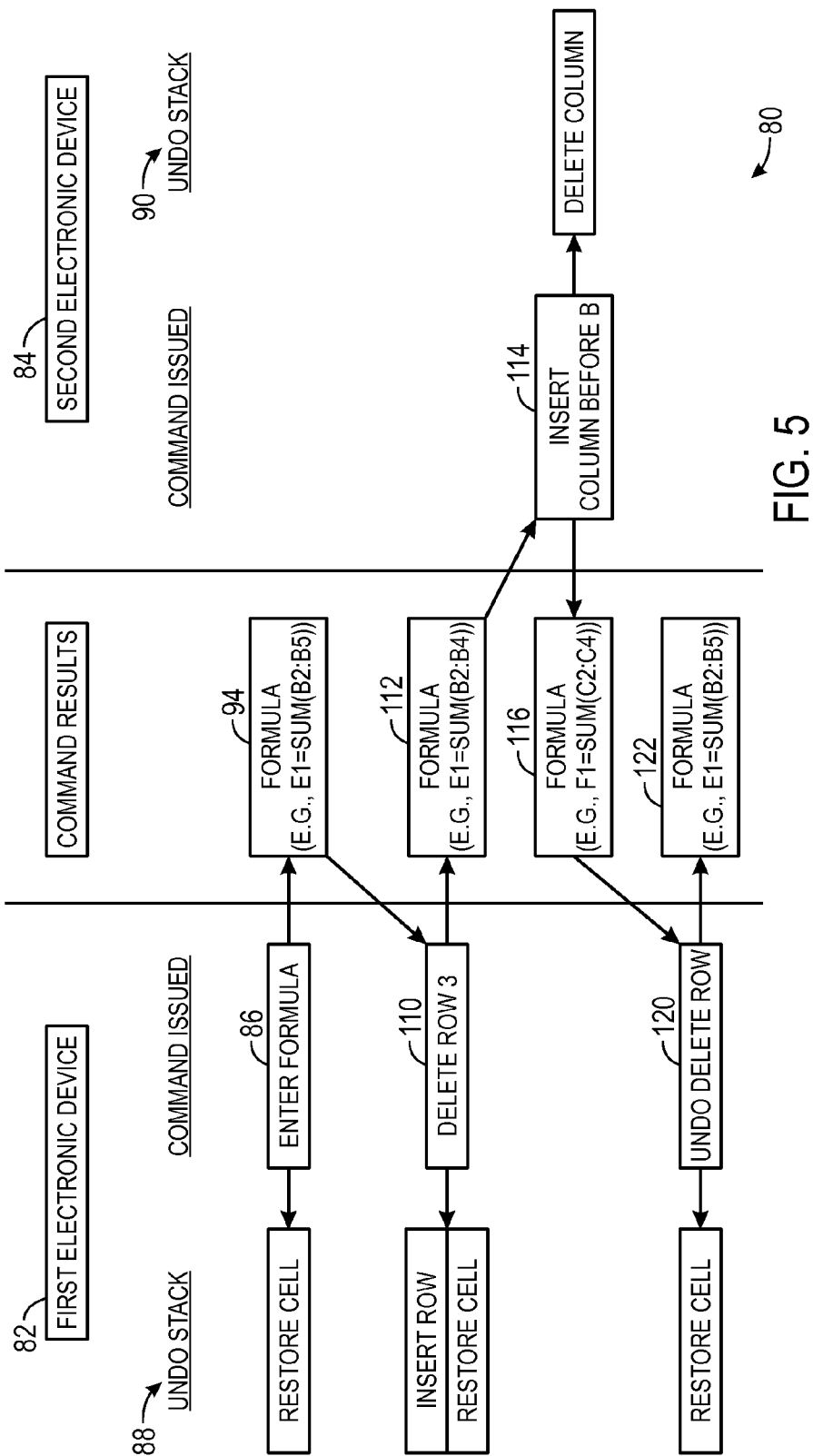
FIG. 5 depicts an example process flow of a conventional collaborative operation having loss of collaborative changes.

For example, turning to FIG. 5, a process flow 80 is depicted representing the interactions between a first electronic device 82 and second electronic device 84 working in collaboration on a document, such as a spreadsheet table. In this example, a formula is entered (block 86) by user A on the first electronic device 82. As a consequence of this action, the undo stack 88 of the first electronic device is populated with the inverse command to restore the table to the prior state before execution of the forward action entering the formula and the forward command is also sent to second electronic device for execution, though the undo stack 90 of the second electronic device is not populated in response to entering the formula. In this example, the entered formula sets the value of cell E1 to be the sum of cells B2 to B5, which is shown as a result 94 of the formula entry step. As will be appreciated, this formula references other cells of the table.

Figures 6A, 6B, 6C:
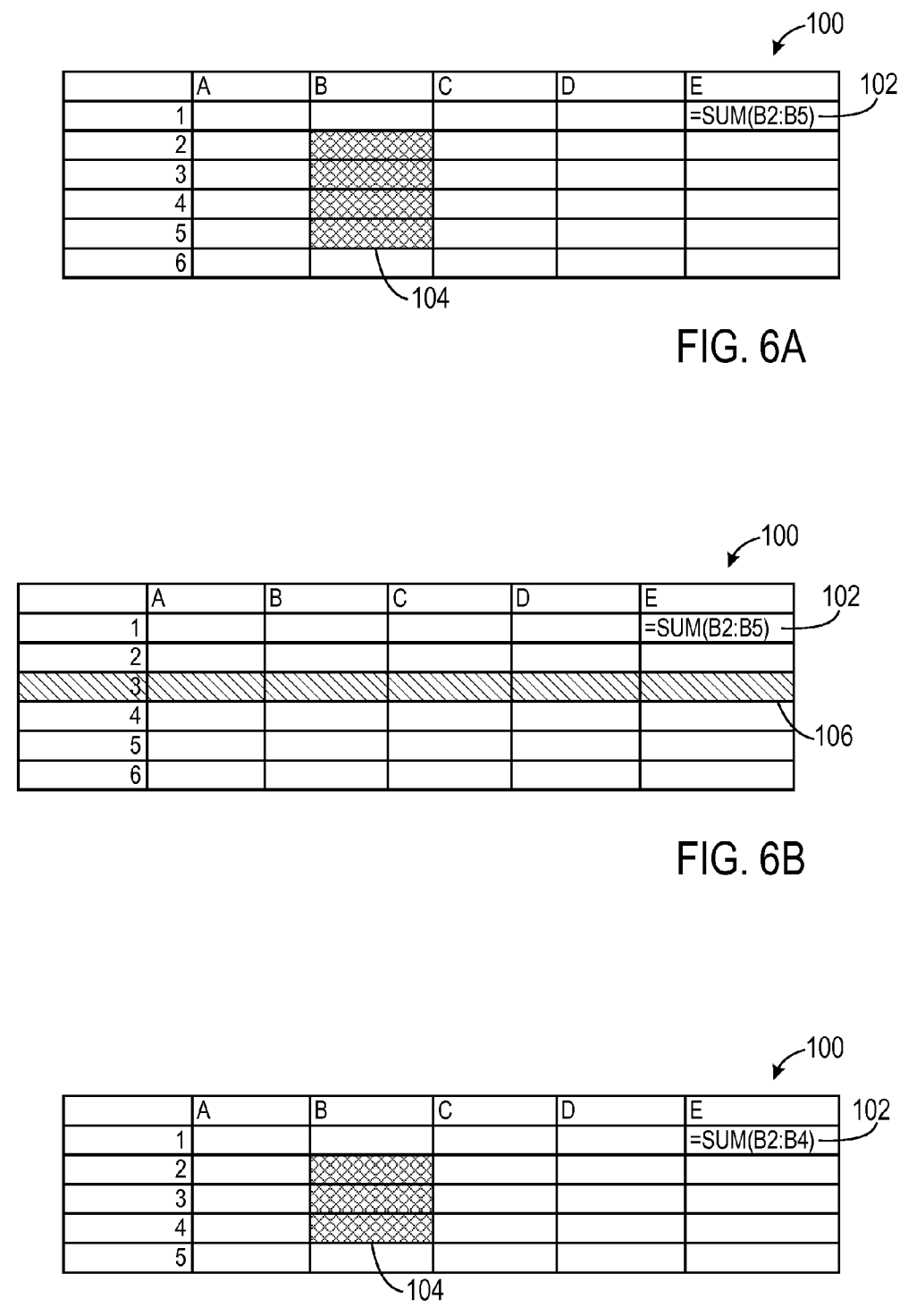

This is represented in FIG. 6A which depicts a sample screenshot of a table 100 in which such a command has been executed for entering such a formula 102 in cell E1 of the table. The cells 104 referenced by the formula 102 are shown with a dotted overlay.

Returning to the process flow, User A next performs an action (block 110) to delete row 3 of the table 100. In response to this forward action, undo stack 88 of the first electronic device 80 is updated with the inverse action (i.e., an insert row action) and the formula is updated (block 112) to reflect that the value of cell E1 is now the sum of cells B2:B4. This is illustrated at FIGS. 6B and 6C, where FIG. 6B illustrates the row 106 (i.e., row 3) to be deleted and FIG. 6C illustrates the effect of the deletion, including the updating of the formula 102. As will be appreciated, in the context of the geometric referencing scheme being used, there is now a new row 3, which is what was previously row 4 which has now been moved up one row along with all lower rows.

Figure 6D:
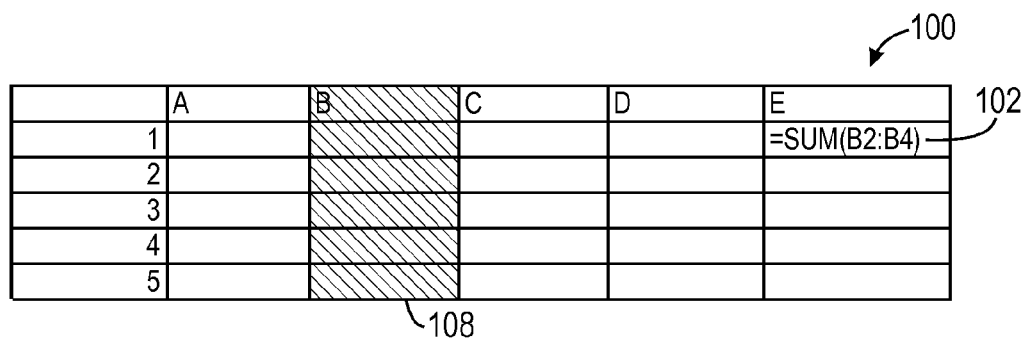
Figure 6E:
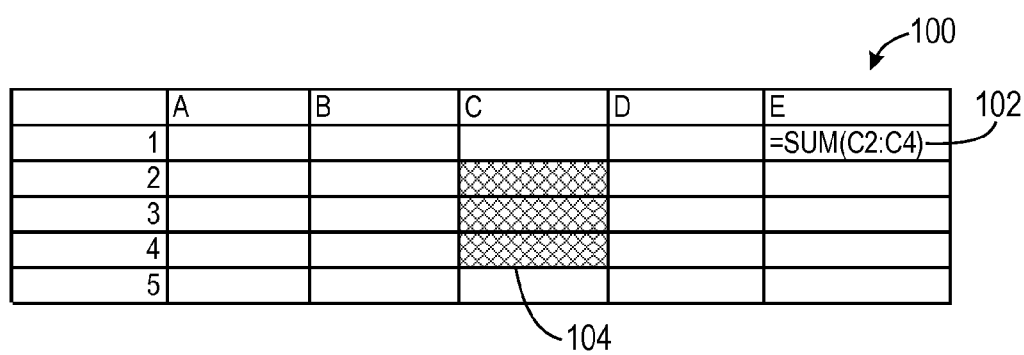

In the present example, the collaborative user (e.g., User B) now performs an action (block 114) on the table 100, namely inserting a column before column B In response to this forward action, undo stack 90 of the second electronic device 88 is updated with the inverse action (i.e., a delete column action) and the formula is updated (block 116). In this example, the formula is updated to reflect that the value of cell F1 (which was previously E1 before the column insertion) is the sum of cells C2 to C4 (which were cells B2:B4 prior to the column insertion). This is illustrated in FIGS. 6D and 6E, where FIG. 6D illustrates the column 108 (i.e., new column C) being inserted and FIG. 6E illustrates the effect of the insertion, including the updating of the formula 102. As will be appreciated, in the context of the geometric referencing scheme being used, there is now a new column B, with the previous column B (and all rightward columns) having been moved to the right one place, with a corresponding change in addressing, as noted above.

Figure 6F:
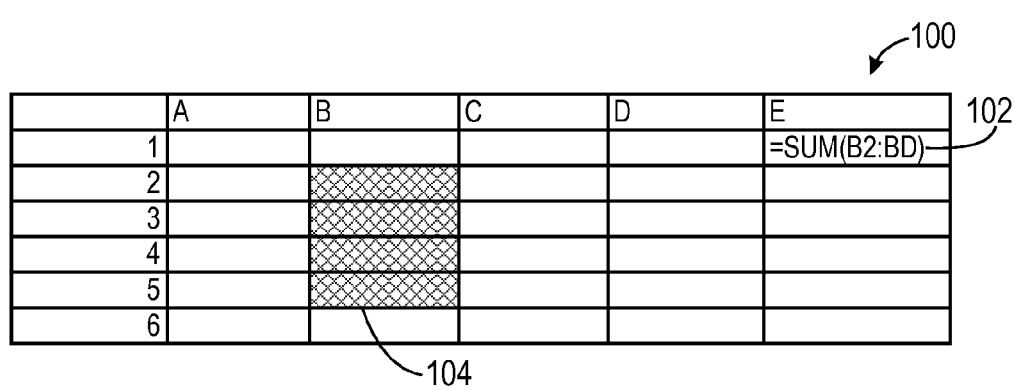

Returning to the example, after insertion of the new column by User B, User A performs an undo (block 120) of his previous action. In response to this undo selection, the most recently added inverse action in the undo stack 88 is performed, here an "insert row" action, and removed from the undo stack 88. In response to the insert row forward action, the formula 102 is returned (block 122) to a prior state, losing the changes (i.e., the insert column action) performed by the collaborator, as illustrated in FIG. 6F.

As noted above, in this example the changes of a collaborator may be lost when one party performs an undo operation when only geometric referencing is employed. As discussed herein, the present approach may help address such potential losses by employing unique identifiers that may help in the tracking and identification of referenced columns, rows, and cells. These unique identifiers may be used to replace or supplement geometric references in formulas. In certain implementations, these identifiers may be used to store information pertaining to parts of the document that have been removed. In addition, in certain implementations, intervening changes made by a collaborator may be selectively accounted for when an undo operation is performed, such as when such changes impact a formula of a table. In one embodiment this may be accomplished by selectively making changes to formula-related operations stored in the undo stack when such operations would be impacted by collaborative change. In other embodiments, collaborative changes may be logged or otherwise retained and, in the event of an undo operation, may be reapplied to a formula or table after an undo action is performed. As will be appreciated, such embodiments for accounting for intervening collaborator changes may also benefit from the use of unique identifiers as discussed herein.

In one embodiment, the unique identification scheme is implemented by assigning some or all of the rows or columns of a table a unique index when generated or as needed (such as in response to an undo stack being created and populated or in response to a formula being entered that references columns, rows, or cells of the table). As used herein, such a unique identifier may be referred to as a universal, unique identifier (UUID) (which may be shortened to [ID] within the figures to simplify illustration). Such UUIDs may be generated and assigned sequentially, in accordance with some predetermined generation and assignment, scheme, or in response to system provided functionality that responds to a request for a number by using various, transitory system parameters as inputs or seeds to generate and return unique numbers that may then be used by the algorithms described herein as unique identifiers.

Unlike the geometric referencing described above, a row, column, or cell referenced by UUIDs retains that referencing regardless of whatever structural changes are made to the table. For example, a row or column assigned a UUID (e.g., UUID 54) retains that UUID even when moved or deleted. In certain implementations, UUIDs are assigned to rows and columns of a table as needed or when generated, and cells may be uniquely referenced by the combination of UUIDs for the relevant columns and rows. In other implementations, cells themselves may be assigned UUIDs and tracked individually as needed, though such an approach may be more resource-intensive.

Figure 7:
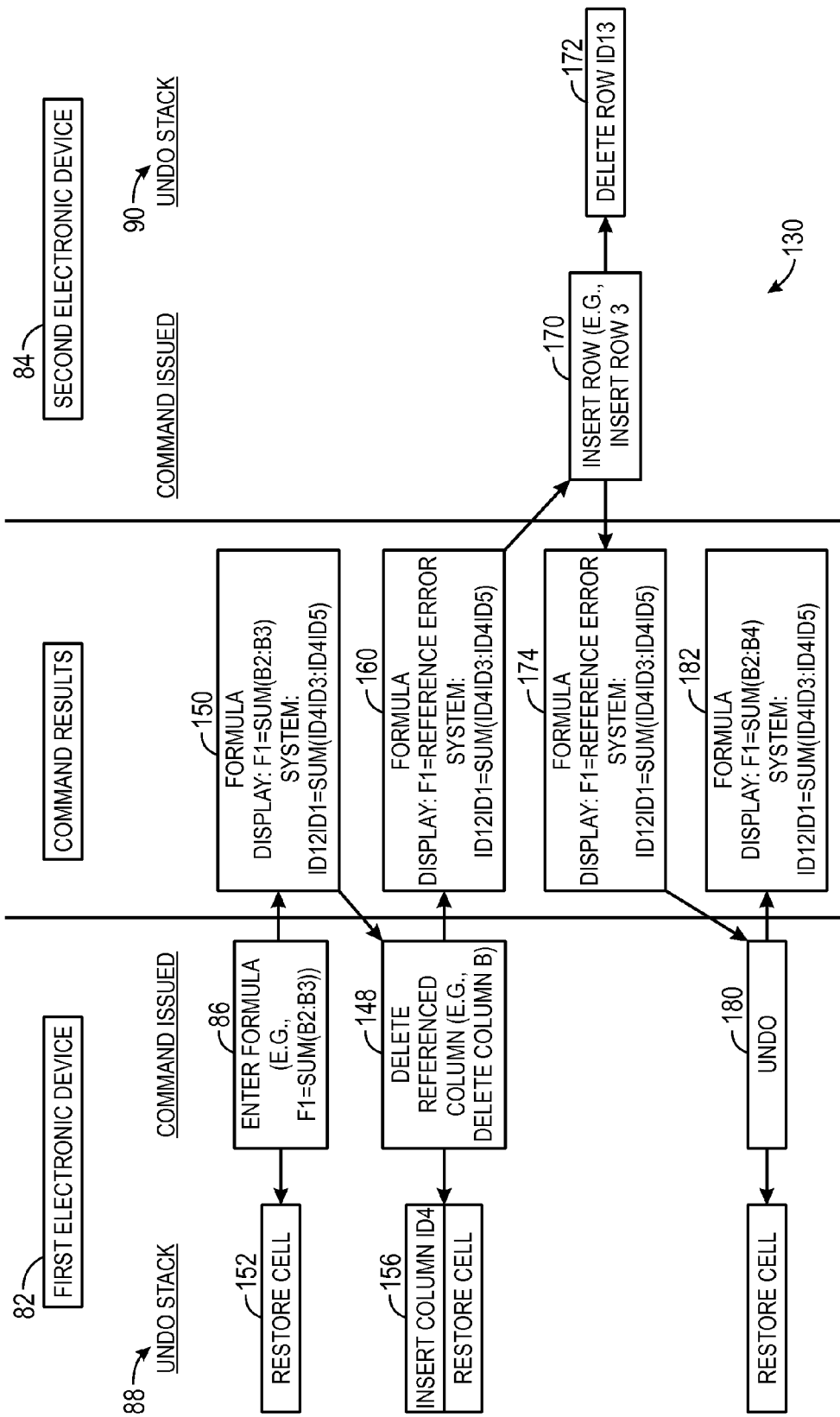
FIG. 7 depicts an example process flow of a collaborative operation involving a formula, in accordance with aspects of the present disclosure.

An example of the use of UUIDs is provided with respect to FIGS. 7 and 8A to 8E. Turning to FIG. 7, a process flow 130 is depicted representing the interactions between the first electronic device 82 and second electronic device 84 working in collaboration on a document, such as a spreadsheet table. In this example, a formula is entered (block 86) by User A on the first electronic device 82. As a consequence of this action, the undo stack 88 of the first electronic device is populated with an inverse command 152 to restore the respective cell to the prior state before entry of the formula and the forward command is also sent to the second electronic device for execution. In this example, the entered formula sets the value of cell F1 to be the sum of cells B2 to B3, which is shown as a command result 150 of the formula entry step. As will be appreciated, this formula references other cells of the table.

Unlike the preceding example, however, in the implementation shown in FIGS. 7 and 8, some or all of the columns and rows of the table 100 may be displayed and identified by a user using conventional geometric referencing, but the system (e.g., devices 82, 84 or applications running on the devices) may employ UUIDs instead of or in addition to the geometric references for tracking row, columns, or cells impacted by user actions. For example, in FIG. 7 at blocks 86 and 150 and at FIG. 8A, a user may input the formula "=sum(B2:B3)" in cell F1, but the system, using the UUIDs assigned to the respective columns and rows of table 100 (denoted as [IDn] in FIGS. 8A-8E) may track these rows and columns using the UUIDs.

Figure 8A:
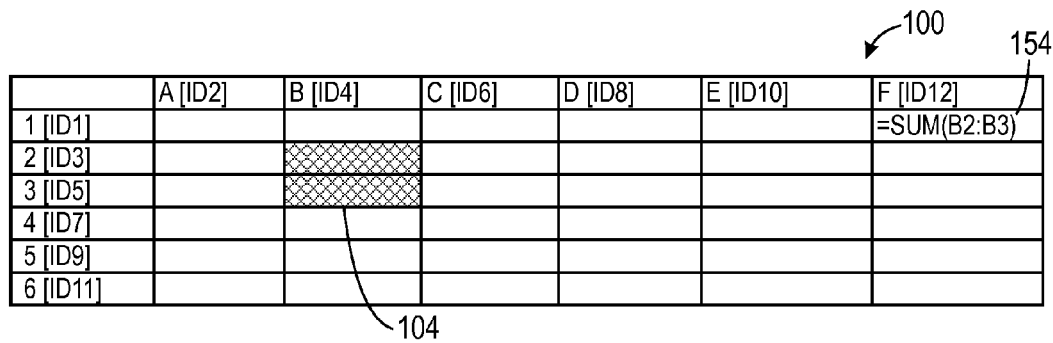
FIGS. 8A-8E depict sample screen shots corresponding to the process flow of FIG. 7.
Figure 8B:
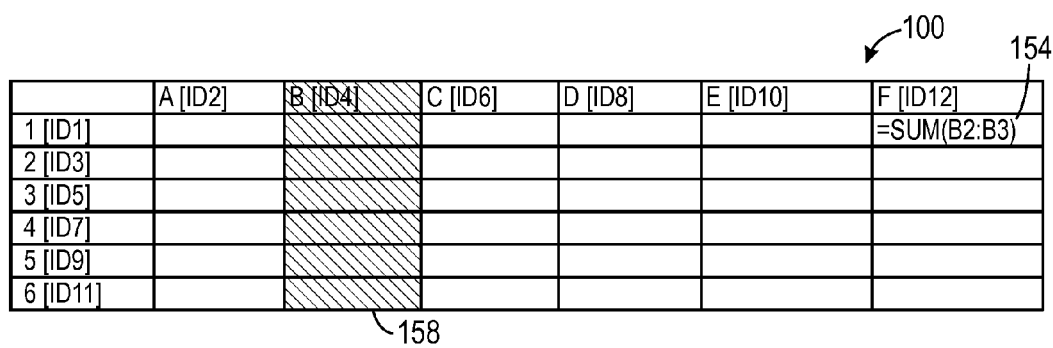
Figure 8C:
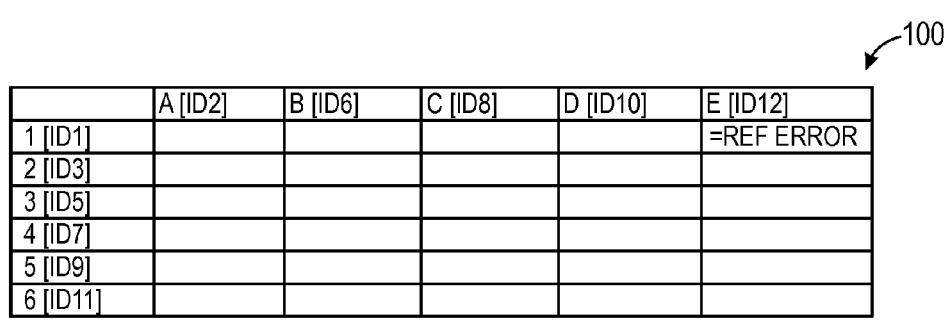

This is represented in FIG. 8A which depicts a sample screenshot of a table 100 in which such a command has been executed for entering a formula 154 in cell F1 of the table. The cells 104 referenced by the formula 152 are shown with a dotted overlay. Unlike the preceding example, however, FIG. 8A also shows the UUIDs (shown as [IDn]s) for each row and column though, as will be appreciated, the UUIDs will typically not be visible in this manner to a user and are here only illustrated to facilitate explanation. Thus, as illustrated, cell F1 may be uniquely referenced as [ID12][ID1] and the referenced cells may also be uniquely referenced using the respective UUIDs. In this manner, the first electronic device 82 may track or utilize a version of the formula that has been transformed to incorporate UUIDs to uniquely identify the referenced cells, and will thereby continue to reference the proper cells even if changes are made to the table 100.

This can be observed in the subsequent operations illustrated in FIG. 7. For example, after entry of the formula, the User A next deletes (block 148) a column, here column B, which is uniquely identified with the UUID [ID4] in FIGS. 8A and 8B. Thus, undo stack 88 of first electronic device 82 is populated with the inverse command (block 156) to insert column [ID4], which will continue to identify this column and the corresponding cells 158 (FIG. 8B) even after deletion.

In the depicted example, deletion of the column corresponding to the UUID [ID4] results in the deletion of the cells referenced by the formula 154, resulting in a reference error message (FIG. 8C) being displayed (block 160). The system, however, continues to properly store and track the referenced cells by their corresponding UUID identifiers, even though the referenced cells are deleted at the time.

Figure 8D:
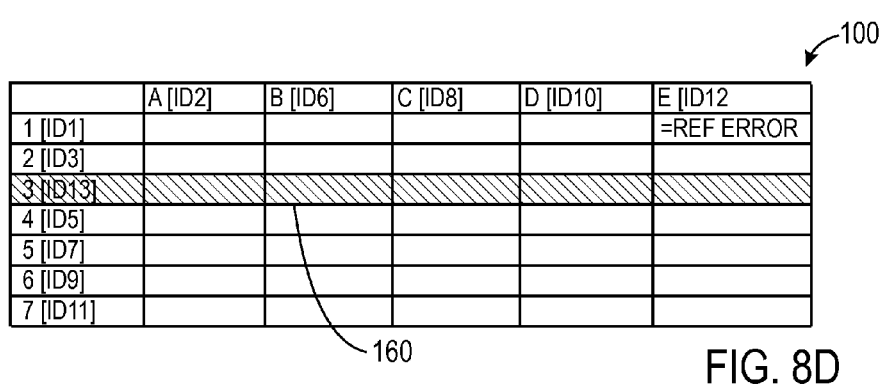
Figure 8E:
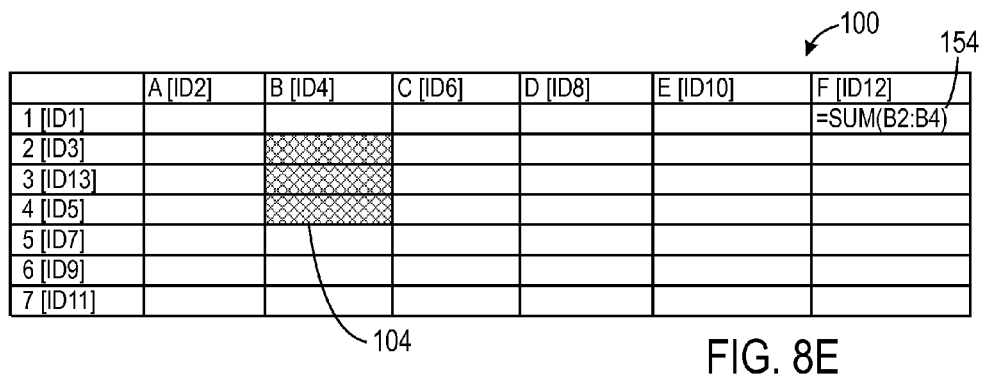

In this example, User B next performs an action, inserting a row (block 170) beneath existing row 2. The new row 160, when generated, is assigned a UUID, here [ID13] (FIGS. 8D and 8E). This UUID is used to identify the new row in the undo stack 90 of the second electronic device 84 where a corresponding and inverse command (delete row [ID13]) (block 172) is provided.

As the cells referenced by the formula are still deleted, the reference error message continues to be displayed to the user (FIG. 8D and FIG. 7 at block 174). Likewise, the formula continues to be tracked by the system and is still defined by the range corresponding to UUIDs [ID4][ID3] to [ID4] [ID5], though it should be appreciated that this defined range now also encompasses a cell of the newly added row corresponding to [ID13]. This can be seen more clearly when User A performs an undo (block 180), causing the "insert column [ID4]" action in the undo stack 88 to be performed, as can be seen in FIG. 8E. Upon completion of this action, the formula 154 properly reflects the presence of newly added row [ID13] between rows [ID3] and [ID5] (FIG. 8E and block 182 of FIG. 7).

Figure 9:
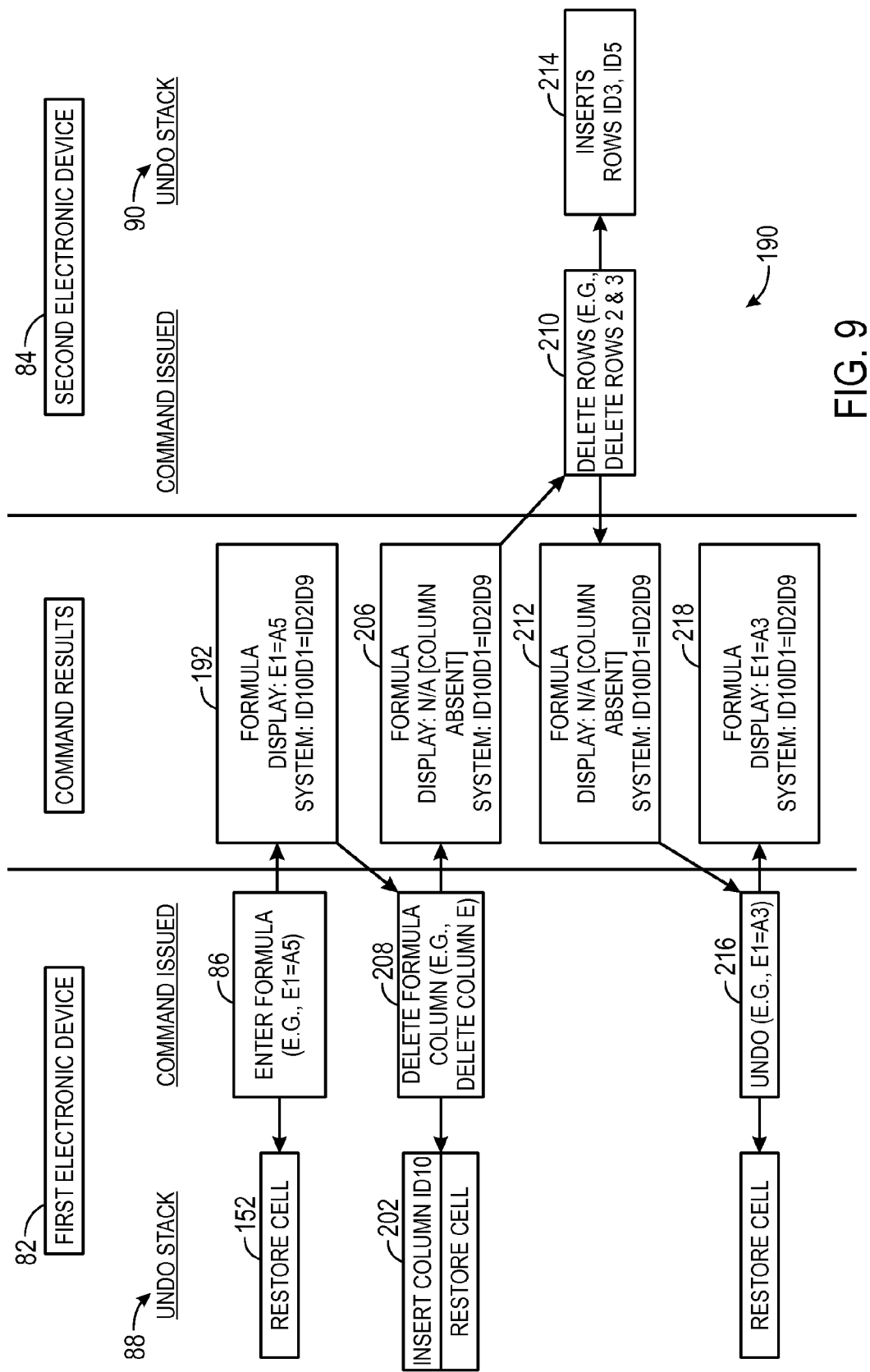
FIG. 9 depicts a further example process flow of a collaborative operation involving a formula, in accordance with aspects of the present disclosure.

Turning to FIG. 9 and FIGS. 10A to 10E, an additional example is provided. Turning to FIG. 9, a process flow 190 is depicted representing the interactions between the first electronic device 82 and second electronic device 84 working in collaboration on a document, such as a spreadsheet table. In this example, a formula is entered (block 86) by user A on the first electronic device 82. As a consequence of this action, the undo stack 88 of the first electronic device is populated with an inverse command 152 to restore the respective cell to the prior state before entry of the formula and the forward command is also sent to second electronic device 84 for execution. In this example, the entered formula sets the value of cell E1 to equal the value of cell A5, which is shown as a command result 192 of the formula entry step. As will be appreciated, this formula references another cell of the table.

As with the preceding example, the columns and rows of the table 100 are identified by the respective systems by UUIDs for at least certain operations, such as undo operations. The UUIDs, however, as discussed above may be largely or entirely invisible to the users, who may instead see and utilize conventional geometric referencing in performing their operations.

Figure 10D:
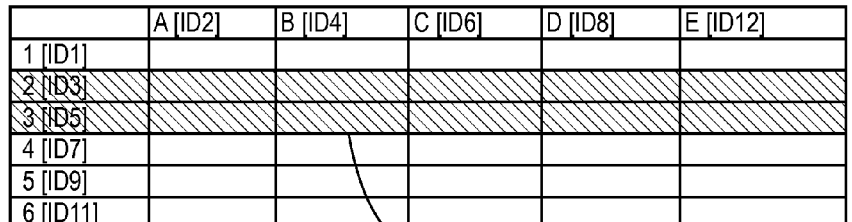
Figure 10E:
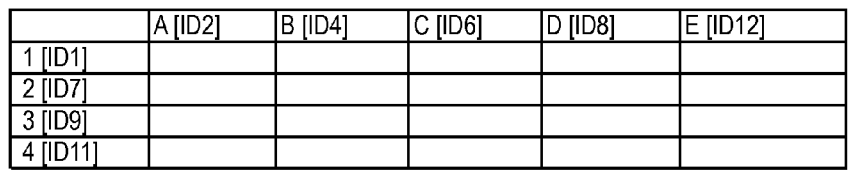

Turning to the figures, at blocks 86 and 192 (FIG. 9), a user may input the formula "=A5" in cell E1, but the system, using the UUIDs assigned to the respective columns and rows of table 100 may track these rows and columns using the UUIDs. This is represented in FIG. 10A which depicts a sample screenshot of a table 100 in which such a command has been executed for entering a formula 198 in cell E1 of the table. The cell 104 referenced by the formula 198 is shown with a dotted overlay. As with the preceding example, FIGS. 10A to 10F also show UUIDs (shown as [IDn]s) for each row and column though, as will be appreciated, the UUIDs will typically not be visible in this manner to a user and are here only illustrated to facilitate explanation. Thus, as illustrated, cell E1 is uniquely referenced as [ID10][ID1] and the referenced cell may also be uniquely referenced using the respective UUIDs. In this manner, the first electronic device 82 may track or utilize a version of the formula that has been transformed to incorporate UUIDs to uniquely identify the referenced cell and the cell containing the formula, and will thereby continue to reference the proper cells even if changes are made to the table 100.

This can be observed in the subsequent operations illustrated in FIG. 9. For example, after entry of the formula, the User A next deletes (block 208) the column containing the formula, i.e., column E, which is uniquely identified with the UUID [ID10] in FIGS. 10A and 10B. Thus, undo stack 88 of first electronic device 82 is populated with the inverse command (block 202) to insert column [ID10], which will continue to identify this column as well as the contents (i.e., formula 198) of the respective cells of column [ID10] even after deletion.

The displayed results of this operation are depicted in FIGS. 10B and 10C, in which, deletion of the column (column 204 of FIG. 10B) corresponding to the UUID [ID 10] results in the deletion of the cell containing the formula 198, resulting in no formula being displayed (FIG. 9, block 206 and FIG. 10C). As noted above, however, the system continues to properly store and track the cells of the column having UUID [ID10] and their contents (including formula 198), even though the column and its cells are deleted at the time.

In this example, User B next performs an action, deleting two rows (block 210) above the referenced cell in row 5 [ID9]. The deleted rows 212 have UUIDs [ID3] and [ID5] (FIG. 10D). These UUIDs are used to identify the deleted rows in the undo stack 90 of the second electronic device 84 where a corresponding and inverse command (insert rows [ID3] and [ID5]) (block 214) is stored. Upon completion of this operation the column corresponding to [ID10], which includes the entered formula 198, and the rows corresponding to [ID3] and [ID5] are absent from the table 100 (FIG. 10E), though still known and tracked by their unique reference identifiers in the respective undo stacks (block 212).

Figure 10F:
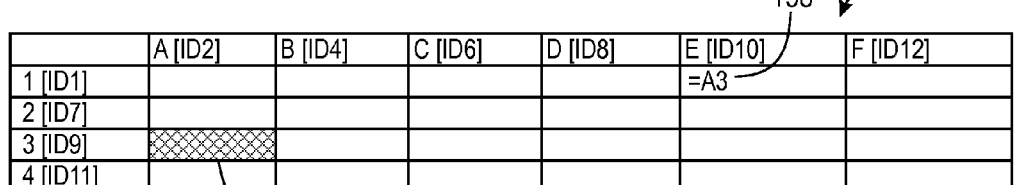

When User A performs an undo operation (block 216), the "insert column [ID10]" command in the undo stack 88 is executed, as can be seen in FIG. 10F. Upon completion of this action, the column corresponding to [ID10] is restored, including the formula 198. Further, the formula 198 continues to reference the cell corresponding to column [ID2] and row [ID9], despite the geometric reference for this cell having changed due to the row deletions by the collaborator, User B, as shown by block 218 of FIG. 9.

As will be appreciated, use of UUIDs may be helpful in a variety of circumstance to prevent loss of collaborator changes or to otherwise insure proper referencing is maintained in a formula within a table. In some circumstances, however, it may not be necessary to employ UUIDs for all columns or rows or over an extended period. For example, columns and rows that are not impacted by a collaborator's actions may benefit from continuing to be referenced geometrically. Further, once a set of changes in undone or is thoroughly incorporated into a document, it may be useful to revert back to geometric referencing for a variety of reasons, including resource management. Thus, it may be useful to employ unique referencing selectively or in combination with geometric referencing, with UUIDs only employed in circumstances where there is a possibility that changes or data may be lost, and with conversion back to geometric referencing once such a possibility is passed.

With this in mind, and turning to FIGS. 11 and 12A to 12F, a process flow 220 is depicted representing the interactions between the first electronic device 82 and second electronic device 84 working in collaboration on a document, such as a spreadsheet table. In this example, a formula is entered (block 86) by User A on the first electronic device 82. As a consequence of this action, the undo stack 88 of the first electronic device is populated with an inverse command 152 to restore the respective cell to the prior state before entry of the formula and the forward command is also sent to second electronic device for execution. In this example, the entered formula sets the value of cell F1 to be the sum of cells B2 to C3, which is shown as a command result 222 of the formula entry step. As will be appreciated, this formula references other cells of the table.

In this example, only some of the columns or rows of the table are referenced using UUIDs, with other columns and rows, where possible, being referenced by the system geometrically. For example, in FIG. 11 at blocks 86 and 222 and at FIG. 12A, a user may input the formula "=sum(B2:B3)" in cell F1. Absent any other actions being taken, the system may continue to employ geometric referencing to track these rows and columns (block 222).

This is represented in FIG. 12A which depicts a sample screenshot of a table 100 in which such a command has been executed for entering a formula 224 in cell F1 of the table. The cells 104 referenced by the formula 224 are shown with a dotted overlay. In this manner, the first electronic device 82 may track or utilize a geometrically referenced version of the formula 224 until such time as changes are made to the table that would indicate use of UUIDs is warranted.

Figure 11:
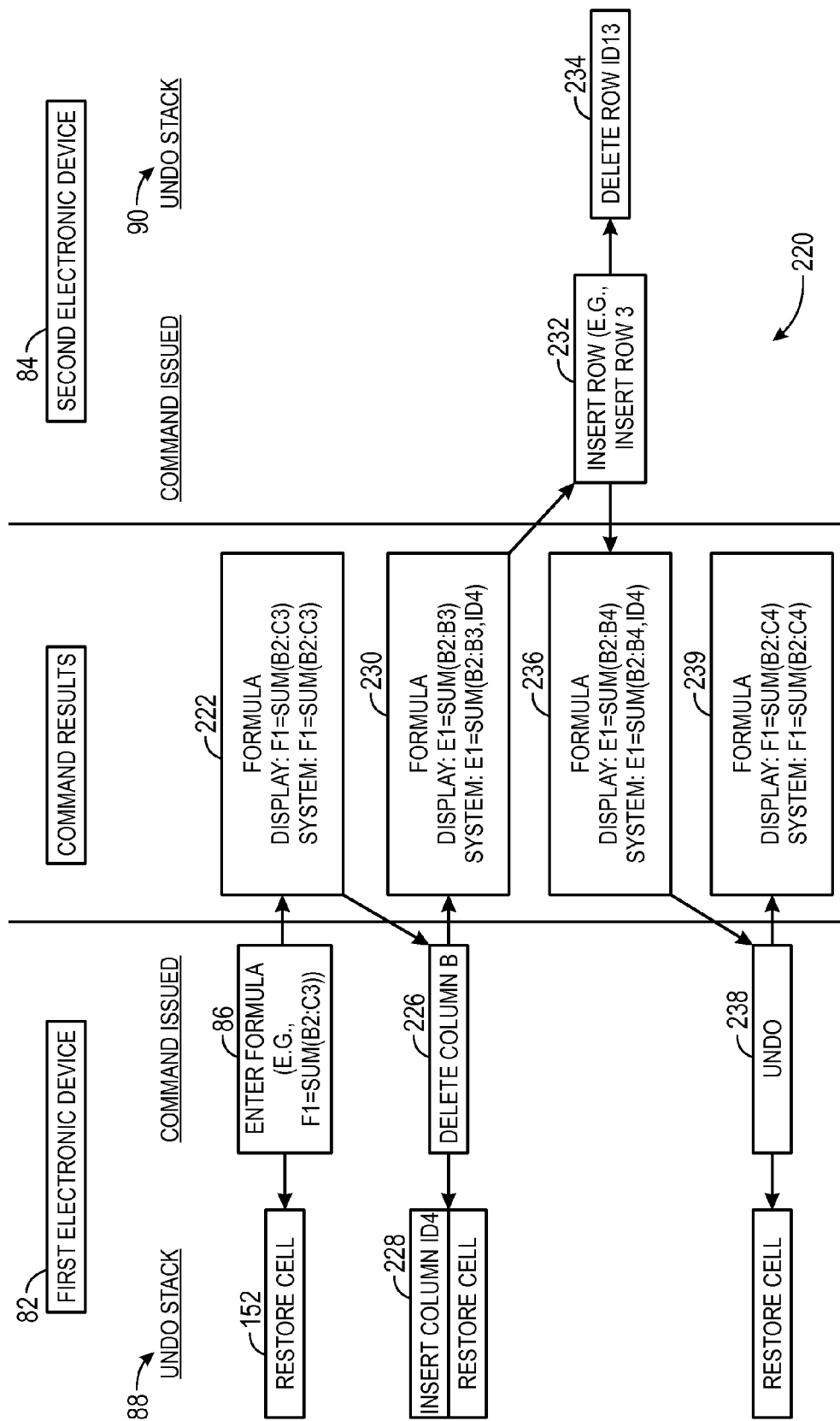
FIG. 11 depicts an additional example process flow of a collaborative operation involving a formula, in accordance with aspects of the present disclosure.

For example, in the subsequent operations illustrated in FIG. 11 User A may next delete (block 226) a column, here column B, which is uniquely identified with the UUID [ID4]. Thus, undo stack 88 of first electronic device 82 is populated with the inverse command (block 228) to insert column [ID4], which will continue to identify this column and the corresponding cells (FIG. 12B) even after deletion.

In the depicted example, deletion of the column corresponding to the UUID [ID4] results in the deletion of some of the cells referenced by the formula 224, causing the displayed formula to be revised to "=SUM(B2:B3)" (FIG. 12C). The system, however, (block 230 of FIG. 11) selectively utilizes UUIDs to properly store and track the referenced cells by their corresponding UUID identifiers and, where feasible, geometric references. For example, as shown in Block 230, the system may track the formula as "E1=SUM (B2:B3, ID4)" to account for the deleted column.

Figure 12D:
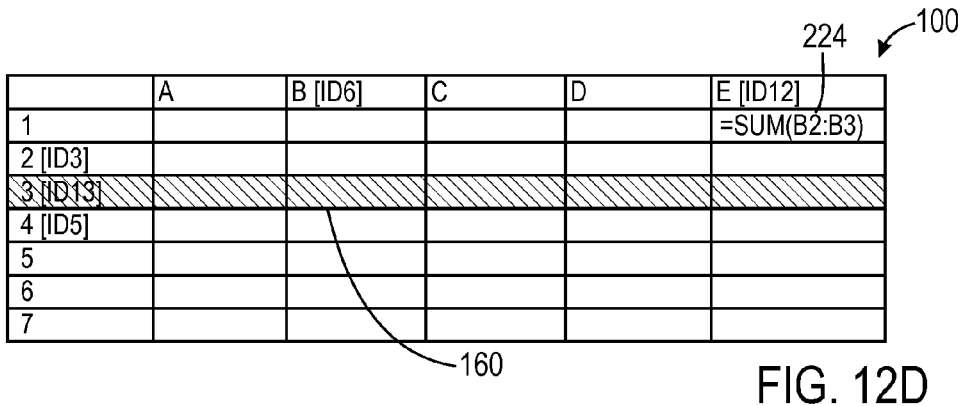
Figure 12E:
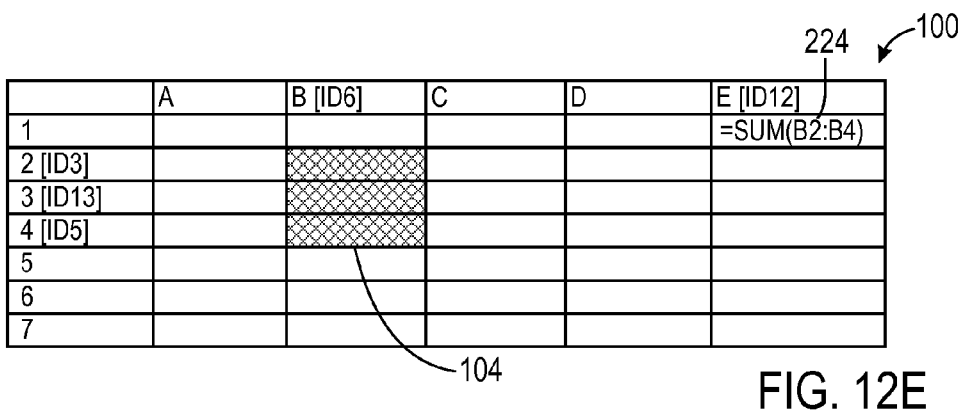

In this example, User B next performs an action, inserting a row (block 232) beneath existing row 2. The new row, when generated, is assigned a UUID, here [ID13] (FIGS. 12D and 12E). This UUID is used to identify the new row in the undo stack 90 of the second electronic device 84 where a corresponding and inverse command (delete row [ID13]) (block 234) is provided.

As the row insertion has inserted a cell into the range specified by the formula, the displayed formula is updated to "E1=SUM(B2:B4)". The system tracked formula, however, still tracks the deleted row [ID4]. The system tracked formula, therefore, in this example may instead be represented at block 236 as "E1=SUM (B2:B4, ID4)" to account for both the added row and deleted column.

Figure 12F:
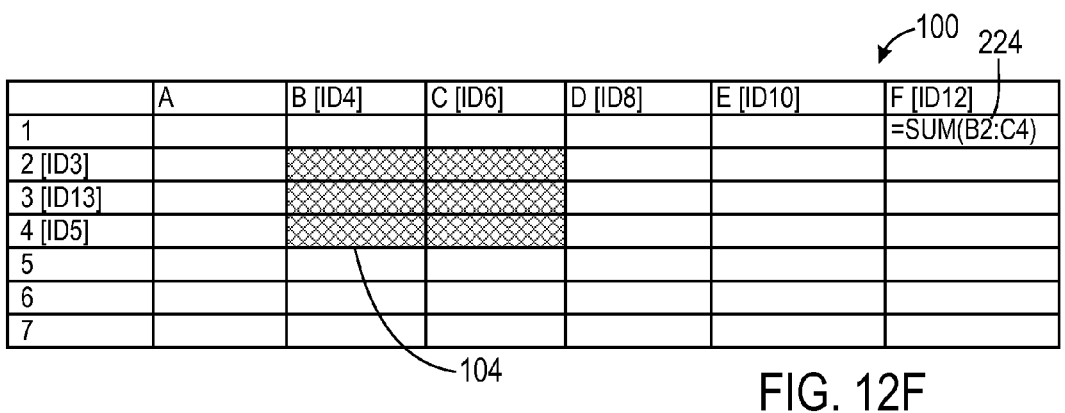

In the depicted example, User A next performs an undo (block 238), causing the "insert column [ID4]" action in the undo stack 88 to be performed, as can be seen in FIG. 12F. Upon completion of this action, the formula 224 properly reflects the presence of newly added row 3 [ID13] between rows [ID3] and [ID5] (FIG. 12F and block 239 of FIG. 11). The displayed formula (block 239) may be represented geometrically as "F1=SUM (B2:C4)" both for display and for the purposes of system tracking. Thus, use of geometric and unique referencing may both be employed, when appropriate, to allow system tracking of columns, rows, and cells so as to avoid loss of changes in a collaborative context.

As noted above, in certain embodiments it may also be useful to apply or track changes performed by a collaborator that might still be lost even when UUIDs are used to reference cells, columns, and rows within a table. For example, in one embodiment actions taken by a collaborator (e.g., User B) that are determined to affect a formula referenced in the undo stack of a first user (e.g., User A) may be applied and used to modify the stored undo actions such that, upon receiving an undo command, the formula incorporates the action or actions taken by the collaborator between when the undo action was stored and when the undo command was received. Such selective application of actions to formula related aspects of the undo stack is distinct from more generalized approaches, where all collaborator actions may be used to modify the commands in the undo stack.

Alternatively, in another embodiment a log may instead be maintained of actions taken by a collaborator which includes data that can be used to determine the order and timing of such collaborator actions. In such an embodiment, upon performing an undo operation, the log may be referenced to "roll forward" any actions in the log needed to bring the results of the undo operation as they apply to a formula up to the present state of the table in terms of collaborative changes. Regardless of the implementation, either of these approaches, in conjunction with the use of UUIDs or other unique identifiers may be used to help prevent the loss of changes or data to a formula in a collaborative document setting.

With the preceding discussion in mind, the original example in which collaborator changes were lost may be revisited. Turning to FIG. 13 and FIGS. 14A-14F, a process flow 240 is depicted as discussed in the examples above and corresponding to the initial change-loss example.

In this example, a formula is entered (block 86) by user A on the first electronic device 82. As a consequence of this action, the undo stack 88 of the first electronic device is populated with an inverse command 152 to restore the respective cell to the prior state before entry of the formula and the forward command is also sent to second electronic device for execution. In this example, the entered formula sets the value of cell E1 to be the sum of cells B2 to B5, which is shown as a command result 244 of the formula entry step. As will be appreciated, this formula references other cells of the table.

At blocks 86 and 244 (FIG. 13), a user may input the formula "=SUM(B2:B5)" in cell E1, and the system, at this point, may track the formula using this geometric referencing. As collaborator changes are made, however, the system may use the UUIDs assigned to certain of the columns and rows of table 100 and may track these rows and columns using the UUIDs.

As represented in FIG. 14A, a sample screenshot is depicted of a table 100 in which a formula 102 is entered into cell E1 of the table 100. The cells 104 referenced by the formula 102 are shown with a dotted overlay.

In the subsequent operations illustrated in FIG. 13, after entry of the formula, the User A next deletes (block 110) a row, here row 3, which is uniquely identified with the UUID [ID5] in FIGS. 14A and 14B. Thus, undo stack 88 of first electronic device 82 is populated with the inverse command (block 248) to insert row [ID5], which will continue to identify this row and the corresponding cells 106 (FIG. 14B) even after deletion. The table 100 after deletion of row [ID5] is shown in FIG. 14C.

In the depicted example, deletion of the row corresponding to the UUID [ID5] results in the deletion of a cell (i.e., [ID4][ID5]) referenced by the formula 102, resulting in a change to the displayed formula 102, as shown at block 250 of FIG. 13 and in FIGS. 14B and 14C. The system, however, continues to properly store and track the deleted row, including the referenced cell, by the corresponding UUID identifiers, even though the column and referenced cell are deleted at the time.

Figure 14D:
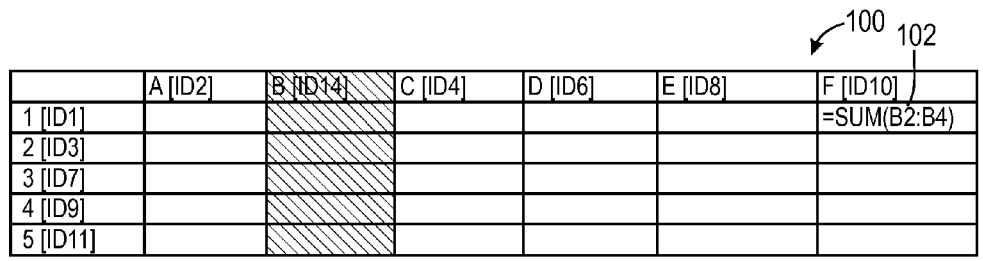
Figure 14E:
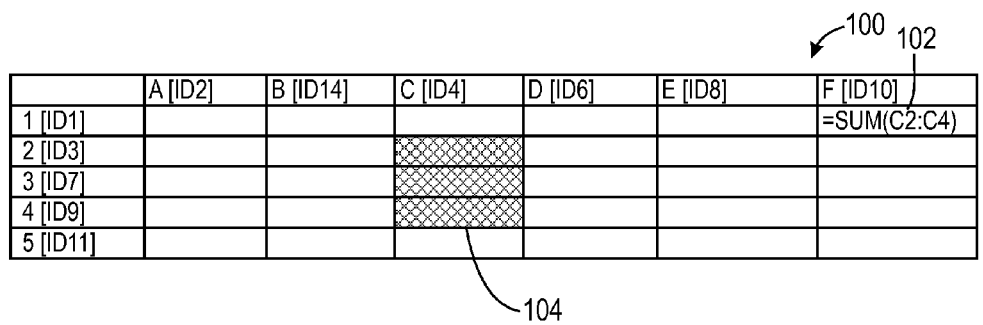

In this example, User B next performs an action, inserting a column (block 114) to the left of column B. The new column, when generated, is assigned a UUID, here [ID14] (FIG. 14E). This UUID is used to identify the new column in the undo stack 90 of the second electronic device 84 where a corresponding and inverse command (delete column [ID14]) (block 254) is provided. In the depicted example, and turning to FIG. 14E, insertion of the new column [ID14] causes an update to the formula 102 to reflect the movement of the formula containing cell and the referenced cells to the right. This is also described at block 256 of FIG. 13, where the displayed formula is shown to be "F1=SUM(C2:C4)" while the version tracked by the system utilizing UUIDs is characterized as "[ID10][ID1]=SUM ([ID14][ID3]:[ID14][ID9])".

Figure 14F:
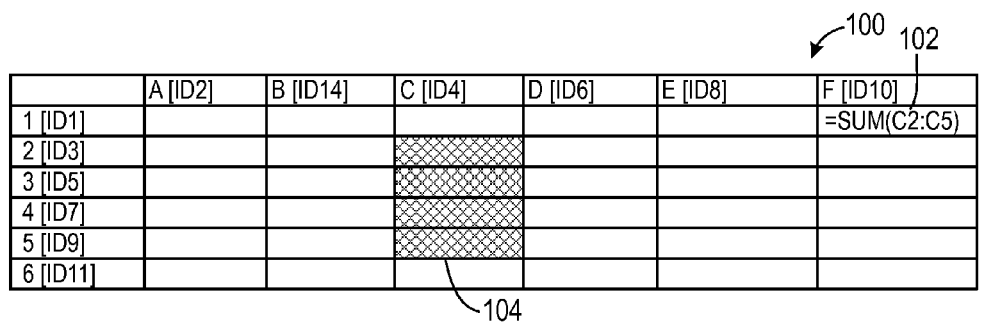

When User A performs an undo operation (block 120), the "insert row [ID5]" command in the undo stack 88 is executed, as can be seen in FIG. 14F. Upon completion of this action, the row corresponding to [ID5] is restored. Thus, row [ID5] is restored but, in addition, added column [ID14], defined by its unique UUID is also still present. Thus, upon updating of the formula 102, this formula continues to reflect the collaborator's addition of a column, as shown in block 260 of FIG. 13, despite the return of row [ID5]. Thus, in this example, the changes of the collaborator are not lost when User A performs an undo operation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A processor-implemented method for making table changes, comprising:
on a first electronic device, editing the table comprising a formula that references one or more other portions of the table;
receiving a first change to a first portion of the table from a user of the first electronic device, wherein the first portion comprises a column, a row, a cell, or any combination thereof;
associate a unique identifier to the first portion of the table, wherein the unique identifier is not dependent on a geometric referencing of the first portion of the table and wherein the unique identifier retains the association to the first portion of the table after an execution of the first change;
executing the first change to the document; and
generating an undo command corresponding to an inverse of the first change and storing the undo command in an undo stack on the first electronic device, wherein the undo command incorporates the unique identifier.

2. The processor-implemented method of claim 1, wherein the first change to the table comprises a move, merge or unmerge, delete, or insert command that incorporates geometric referencing based on address tabs displayed with the document, wherein the geometric referencing is distinct from the unique identifiers.

3. The processor-implemented method of claim 1, wherein the geometric referencing of the first portion of the table comprises column indicators or row indicators displayed with the document.

4. The processor-implemented method of claim 1, further comprising:
receiving a second change to the table from a different user of a second electronic device on which the document is also being edited;
executing the second change to the table on the first electronic device; and
if the second change affects the formula, updating the undo command in the undo stack based on the second change.

5. The processor-implemented method of claim 1, further comprising:
receiving a second change to the table from a different user of a second electronic device on which the document is also being edited;
executing the second change to the table on the first electronic device;
storing the second change in a log on the first electronic device; and
applying the second change to the undo command when the undo command is executed, if the second change affects the formula.

6. The processor-implemented method of claim 1, further comprising:
receiving an undo instruction from on the first electronic device; and
executing the undo command on the first electronic device, wherein the undo command when executed uses the unique identifier to determine affected portions of the document.

7. A non-transitory, tangible computer-readable medium encoding processor-executable routines, wherein the routines, when executed by a processor cause acts to be performed comprising:
receiving edits to a document, wherein the document includes a formula incorporated into a cell of a table, wherein the formula references other cells of the table;
receiving and executing one or more forward actions causing changes to the table that affect the referenced cells or the cell in which the formula is entered;
translating geometric coordinates of the affected reference cells into unique identifiers associated to the affected reference cells, wherein the unique identifiers are not dependent on geometric coordinates after the translation and retain the association to the affected reference cells after execution of the one or more forward actions; and
generating and storing one or more inverse actions corresponding to the one or more forward actions in an undo stack, wherein the one or more inverse actions comprise the unique identifiers.

8. The non-transitory, tangible computer-readable medium, of claim 7, wherein the changes to the table that affect the referenced cells or the cell in which the formula is entered comprise movement, deletion, or insertion of a row, column, or cell of the table.

9. The non-transitory, tangible computer-readable medium, of claim 7, wherein the unique identifiers are not displayed with the table but one or more address indicators corresponding use in formulating the geometric coordinates are displayed.

10. The non-transitory, tangible computer-readable medium, of claim 7, further comprising routines, which when executed by a processor cause acts to be performed comprising:
updating the one or more inverse actions based on subsequent forward actions if the subsequent forward actions impact the formula.

11. The non-transitory, tangible computer-readable medium, of claim 10, wherein the subsequent forward actions are received from a remote collaborator.

12. The non-transitory, tangible computer-readable medium, of claim 7, further comprising routines, which when executed by a processor cause acts to be performed comprising:
logging one or more subsequent forward actions; and
applying the one or more logged forward actions to affected columns, rows, or cells of the table if an undo action is performed that affects the formula.

13. The non-transitory, tangible computer-readable medium, of claim 7, further comprising routines, which when executed by a processor cause acts to be performed comprising:
applying the one or more inverse actions in the undo stack upon receipt of an undo command, wherein the one or more inverse actions, when applied, utilize the unique identifiers to affect changes to the table.

14. A processor-based system, comprising:
a display;
a memory storing one or more routines; and
a processing component configured to execute the one or more routines stored in the memory, wherein the one or more routines, when executed by the processing component, cause the processing component to:
run an application used to generate or modify a collaborative document comprising a table;
receive a change to the collaborative document from a first user, wherein the change references one or more portions of the table using geometric references comprising a column identifier, a row identifier, or both based on an addressing scheme displayed with the collaborative document;

generate unique identifiers that reference the one or more portions of the table and are not dependent on the geometric references, wherein the unique identifiers retain the reference to the one or more portions of the table after the change from the first user;

apply the changes to the collaborative document;

generate an inverse command to the change, wherein the inverse command incorporates the unique identifiers;

populate an undo stack with the inverse command.

15. The processor-based system of claim 14, wherein the unique identifiers are generated by the system in response to a function call to the system for a unique number.

16. The processor-based system of claim 14, wherein the one or more routines further comprise one or more routines which, when executed by the processing component, cause the processing component to:

update the inverse command based on subsequent changes received from a collaborator if the subsequent changes affect a formula present in the collaborative document.

17. The processor-based system of claim 14, wherein the one or more routines further comprise one or more routines which, when executed by the processing component, cause the processing component to:

log subsequent changes received from a collaborator; and apply one or more of the logged subsequent changes when the inverse command is executed if the subsequent changes affect a formula present in the collaborative document.

18. A processor-implemented method for processing collaborative table changes, comprising:

on an electronic device, editing a spreadsheet table in which a formula is embedded, wherein the formula reference one or more of cells, columns, or rows, of the table;

receiving a change to the spreadsheet table, wherein the change affects one or more cells referenced by the formula or a cell in which the formula is located;

determining unique identifiers associated to the one or more cells referenced by the formula, wherein the unique identifiers are not dependent on a geometric addressing of the spreadsheet table;

executing the change to the document;

generating an undo operation corresponding to the change, wherein generating the undo operation comprises generating an inverse of the change and incorporating the unique identifiers; and storing the undo operation in an undo stack on the electronic device.

19. The processor-implemented method of claim 18, further comprising updating the undo operation in response to collaborator changes received after the undo operation is generated.

20. The processor-implemented method of claim 18, further comprising:

tracking collaborator changes made after the undo operation is generated; and applying one or more of the tracked changes when the undo operation is performed.

21. The processor-implemented method of claim 18, wherein the change when received incorporates the one or more geometric references, and wherein the one or more geometric references are based on row and column address indicators displayed with the spreadsheet table.

* * * * *